May 18, 1943. A. C. CHAMBERS 2,319,583
BRAKE
Filed March 29, 1941 3 Sheets-Sheet 2

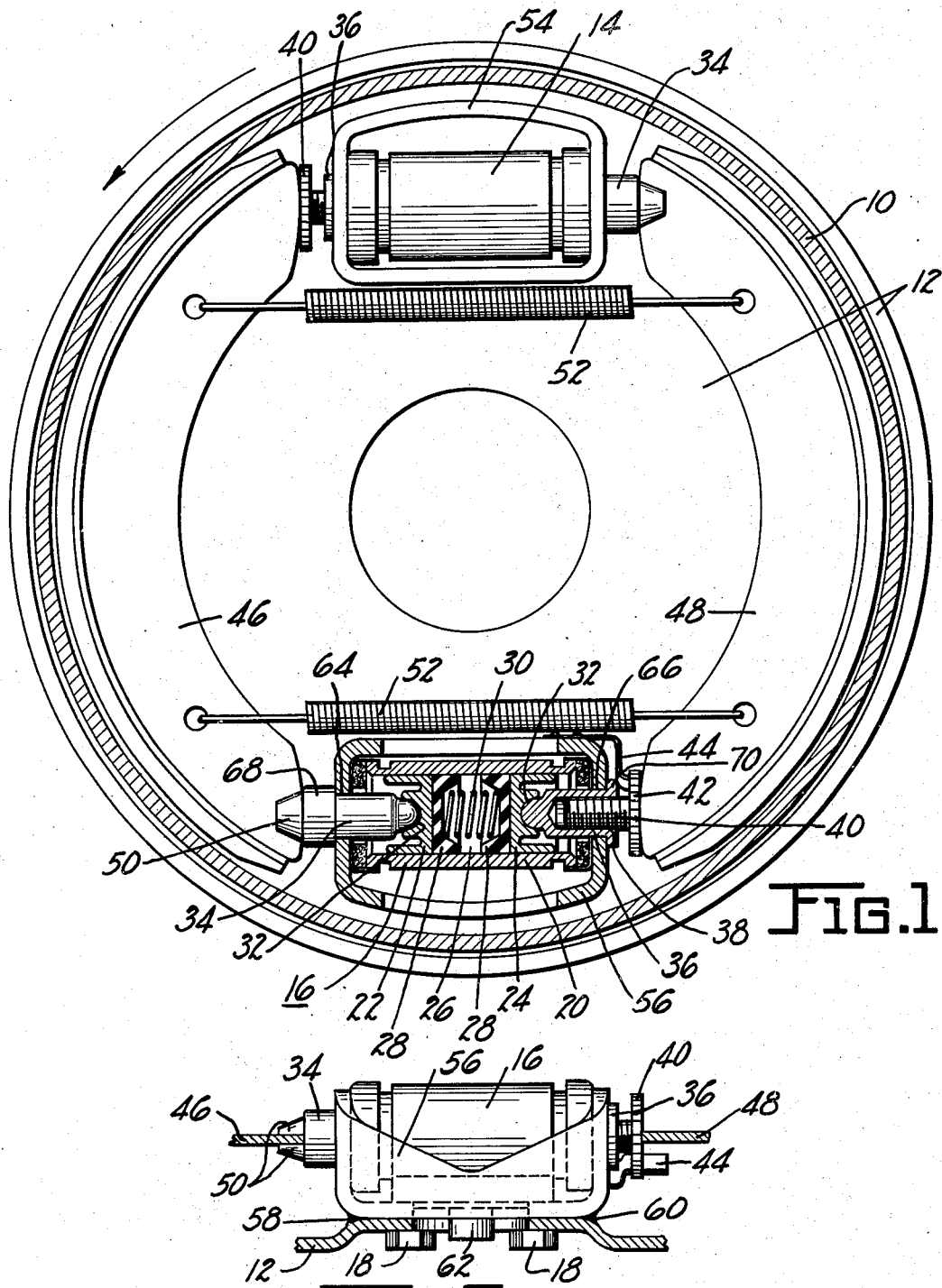

INVENTOR
ALLAN C. CHAMBERS
BY M. W. McConkey
ATTORNEY

May 18, 1943. A. C. CHAMBERS 2,319,583
BRAKE
Filed March 29, 1941 3 Sheets-Sheet 3

INVENTOR
ALLAN C. CHAMBERS
BY
M. W. McConkey
ATTORNEY

Patented May 18, 1943

2,319,583

UNITED STATES PATENT OFFICE 2,319,583

BRAKE

Allan C. Chambers, Detroit, Mich.

Application March 29, 1941, Serial No. 385,783

3 Claims. (Cl. 188—78)

This invention relates to brakes and particularly to brakes of the type having friction elements which are shiftable to anchor at different points depending upon the direction of rotation of the element to be braked.

My invention is illustrated as it might be used in conjunction with a brake having a plurality of individually shiftable brake shoes. The invention might be equally well used where a single shiftable brake element is employed.

One of the objects of my invention is to provide a novel anchoring means for brake shoes. A second object is to provide a combination of shoe spreading and shoe anchoring members which will afford an exceptionally effective brake readily and inexpensively assembled.

Among the features of my brake is the combination of an anchor member with a thrust member extending through an opening in the anchor member, the said thrust member bearing at one end against a brake shoe and at the other end against a motor device for moving the shoe into contact with a brake drum. In the illustration of my invention, I have shown a hydraulic wheel cylinder as the brake applying motor, the said cylinder having a piston or movable wall therein connected to the thrust element.

Other objects and features of my invention will become apparent during the course of the following description, reference being had therein to the accompanying drawings, in which:

Figure 1 is a vertical section through a wheel brake assembly taken on a plane just inside the head of the brake drum;

Figure 2 is a plan view of one of the brake applying units of Figure 1 showing the formation of the anchor and the manner of fixing the anchor to the brake support member;

Figure 3:
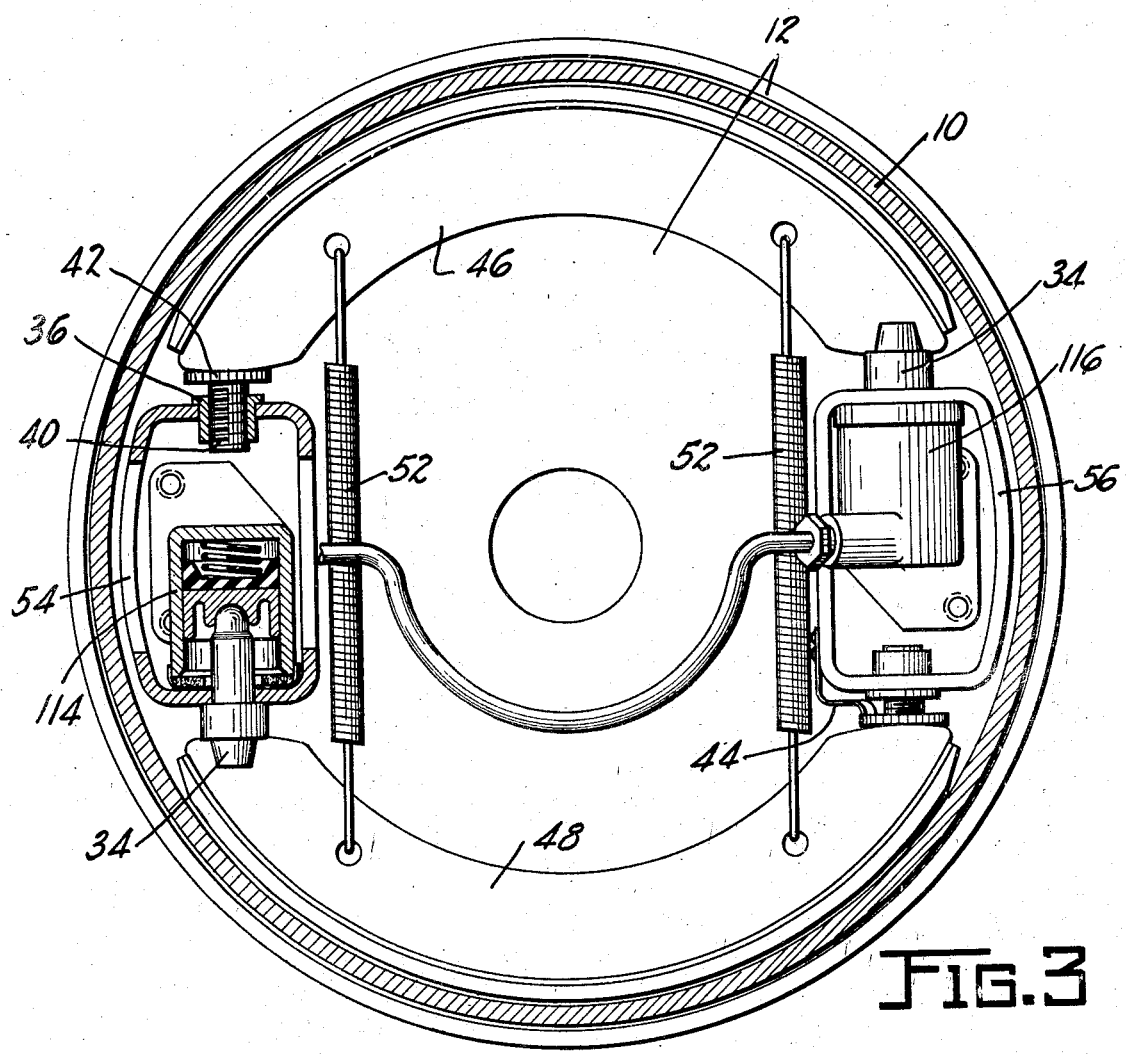
Figure 3 is a vertical section through a wheel brake assembly showing a modification of the brake of Figure 1.

The brake of Figures 1 and 2 includes a rotatable brake drum 10 and a stationary backing plate 12 having mounted thereon a pair of hydraulic wheel cylinders 14 and 16. The wheel cylinders are secured to the backing plate 12 by any suitable means, as for example bolts 18 passing through the backing plate and through flanges extending from the sides of the wheel cylinders. Cylinders 14 and 16, which are substantially identical, are of standard or conventional type and include a cylinder wall 20, and a pair of pistons 22 and 24 which form movable walls for a liquid filled chamber 26 between the said pistons. Each of the pistons 22 and 24 is faced with a flexible sealing cup 28, and a spring 30 is compressed between the sealing cups 28. Each of the pistons has in its outer end a groove 32 to accommodate the inner end of its respective thrust element 34 or 36. The thrust element 36 differs slightly from the thrust element 34 in that it has an internally threaded groove 38 which receives an adjustment screw 40. The adjustment screw 40 has at its outer end a star wheel 42 which may be turned to accomplish adjustment of the brake, but which is normally held in adjusted position by a spring pawl 44.

A pair of brake shoes 46 and 48 constitute the friction elements which are at times moved into contact with the brake drum to retard the rotation thereof. Each of the shoes 46 and 48 normally contacts at one end the outer surface of one of the star wheels 42, and at the other end is received between forks 50 on the outer end of one of the thrust elements 34. The shoes are normally held in released positon and are returned to released position after application by a pair of return springs 52.

The anchoring means for the brake shoes 46 and 48 when they are moved into contact with the drum comprise a pair of box-like structures 54 and 56. Since the two structures are identical only one will be described. The box-like anchor member 56 is of sufficient size to accommodate the length of the hydraulic cylinder 16 within it. The exact shape or form of the box is not restricted, but I have shown it as being open on the side away from the backing plate and as having a substantially flat surface on the side toward the backing plate. This surface may be secured to the backing plate by welding as shown along the lines indicated by the numerals 58 and 60 in Figure 2. It will be obvious that the box anchor members may also be secured to the backing plate by bolts, rivets or equivalent means. Adjacent the centers of the hydraulic wheel cylinders 14 and 16 the box anchor members 54 and 56 and the backing plate 12 have openings to accommodate a nipple 62 which extends from the side of each of the wheel cylinders and to which is connected a hydraulic line or conduit (not shown). Openings 64 and 66 are provided through the ends of the box anchor members to accommodate the thrust elements 34 and 36. The thrust elements 34 and 36 may move freely outward through their respective openings 64 and 66 whenever the pistons in the wheel cylinders force them against the brake shoes to move the shoes into the drum. However, outside the box anchor members 54 and 56 each thrust element 34 has an enlarged diameter portion 68, and each thrust element 36 has an enlarged diameter portion 70. These portions 68 and 70, coming into contact with the sides of the box anchor members, prevent the thrust elements from moving more than a predetermined distance toward the interior of the wheel cylinders and allow the anchoring torque of the brake shoes to be taken by the box anchor members.

As will be readily appreciated, the applying and anchoring ends of the brake shoes 46 and 48 will differ according to direction of rotation of the brake drum. If the brake drum is rotating in a forward direction as indicated by the arrow in Figure 1, and the brakes are applied, the shoe 48 will anchor against the right side of the box anchor member 54, while the shoe 46 will anchor against the left side of the box anchor member 56. If the direction of rotation of the brake drum is rearward, the shoes, when applying force is used, will anchor against the adjusting screws 40 of the wheel cylinders 14 and 16 and the torque will be transmitted through the adjusting screws to the box anchor members 54 and 56.

Figure 4:
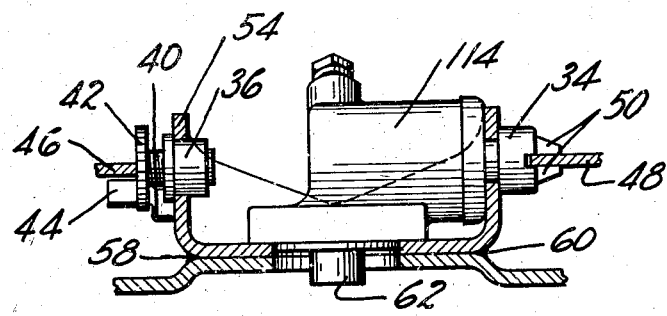
Figure 4 is a plan view of one of the brake applying units of Figure 3.

In the modification shown in Figures 3 and 4, the operation of the brake is substantially the same as that previously shown, except that the shoes anchor only during forward rotation of the brake drum. The box anchor members 54 and 56 are the same as the anchor members of Figures 1 and 2. It will be noted however that in Figure 3 the anchor members and the partially enclosed applying cylinders are provided at the sides of the wheel brake assembly rather than at the top and bottom thereof. The hydraulic wheel cylinders 114 and 116 of the brake of Figure 3 each has only one piston therein. That piston is arranged to actuate an associated thrust element to move one of the brake shoes into contact with the drum. Each of the brake shoes when moved into contact with the drum anchors on an adjustment screw which is at the opposite end of the shoe from the applying piston. Each of the adjusting screws is retained in one side of one of the box anchor members 54 and 56.

Figure 5:
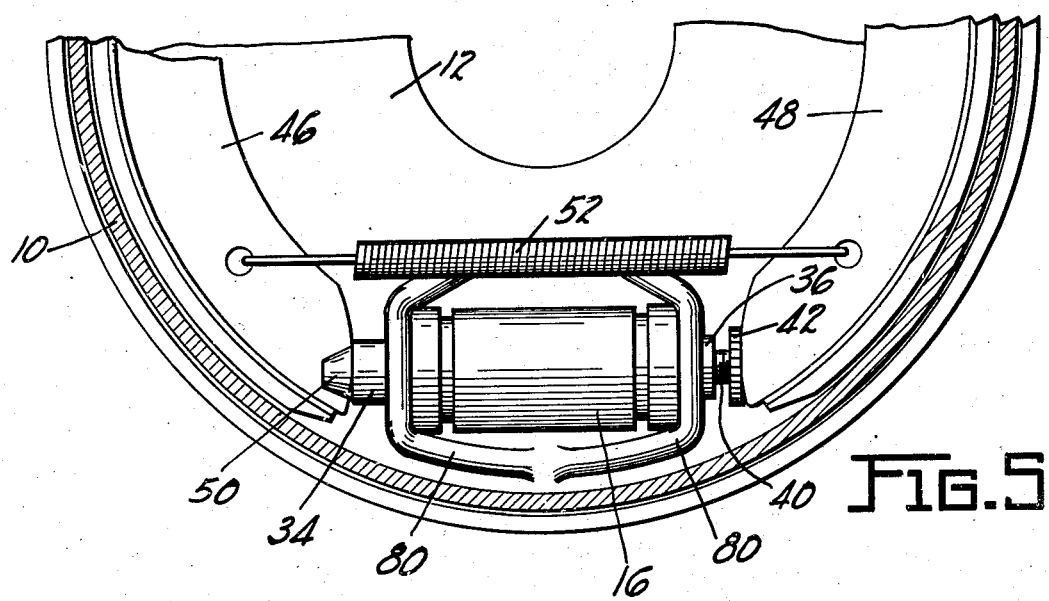
Figure 5 is a vertical section through a wheel brake assembly showing a modification of the anchoring means of Figures 1 and 3.
Figure 6:
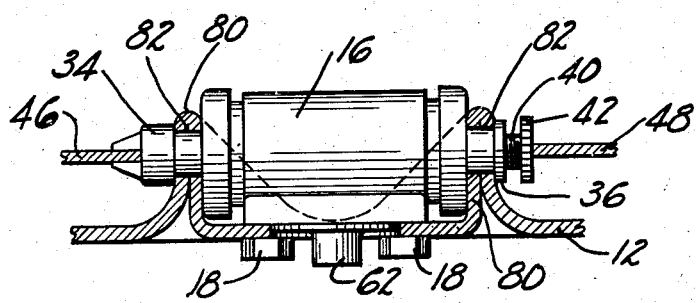
Figure 6 is a part plan, part section view of the brake applying and anchoring means of Figure 5.

In Figures 5 and 6 I have shown anchor members pressed out of the backing plate. As seen in Figure 6, flanges or projections 80 are formed which are integral with the backing plate. The thrust members which serve to connect the pistons to the shoes pass through openings 82 formed through the projections 80. In operation, this device is substantially similar to the devices of Figures 1 and 3 except that the shoes anchor through their respective thrust members against the backing plate projections 80.

While I have described certain specific embodiments of my device, I do not intend to limit my invention thereto or indeed to limit my invention otherwise than by the terms of the appended claims.

I claim:

1. In an internal expanding brake having a fixed backing plate, a rotatable brake drum, and a friction element for impeding rotation of the drum shiftable to anchor at either end according to the direction of drum rotation when it contacts the drum; applying and anchoring means for the friction element comprising a box-like housing secured to the backing plate near an end of the friction element, a hydraulic cylinder mounted inside the housing having a hydraulic pressure responsive piston reciprocable therein, and a thrust element having one end bearing against the piston and the other end bearing against the friction element for transmitting applying force from the piston to the friction element and having a body portion extending through an opening in the side of the housing and a head portion between the friction element and the housing larger than the opening in the housing and arranged to transmit anchoring torque of the friction element from the friction element to the housing.

2. In an internal expanding brake having a fixed backing plate, a rotatable brake drum, and a friction element for impeding rotation of the drum shiftable to anchor at either end according to the direction of drum rotation when it contacts the drum; applying and anchoring means for the friction element comprising a box-like housing secured to the backing plate near an end of the friction element, a hydraulic cylinder mounted inside the housing having a hydraulic pressure responsive piston reciprocable therein, and a force transmitting device comprising a thrust element and an adjustor, the thrust element having an end bearing against the piston for receiving applying force therefrom and having a body portion extending through an opening in the side of the housing and a head portion outside the housing larger than the opening in the housing, and the adjustor being adjustably screwed into the thrust element and having a portion thereof between the friction element and the thrust element for transmitting applying force from the thrust element to the friction element and for transmitting anchoring torque of the friction element to the housing through the intermediary of the thrust element head portion.

3. In an internal expanding brake having a fixed backing plate, a rotatable brake drum, and two brake shoes for impeding rotation of the drum individually shiftable to anchor at either end according to the direction of drum rotation when they contact the drum; applying and anchoring means for the shoes comprising two box-like housings secured to the backing plate between the ends of the shoes, two hydraulic cylinders one mounted inside each housing and each having two hydraulic pressure responsive pistons reciprocable therein, four force transmitting devices each having one end bearing against one of the pistons and the other end bearing against an end of one of the shoes for transmitting applying force from the pistons to the shoes each of said force transmitting devices comprising a thrust element having a body portion extending through an opening in the side of the housing with which it is associated and a head portion between its respective shoe end and the housing larger than the opening in the housing and arranged to transmit the anchoring torque of the shoe to the housing, and two of said force transmitting devices each comprising in addition to such thrust element an adjustor which is adjustably screwed into its associated thrust element and which has a portion thereof between the respective shoe end and thrust element arranged to transmit applying force from the thrust element to the shoe and to transmit anchoring torque of the shoe to the housing through the intermediary of the thrust element head portion.

ALLAN C. CHAMBERS.